(12) United States Patent
Gimenez et al.

(10) Patent No.: US 11,267,197 B2
(45) Date of Patent: Mar. 8, 2022

(54) RECOATER CARRIAGE

(71) Applicant: HEWLETT-PACKARD DEVELOPMENT COMPANY, L.P., Houston, TX (US)

(72) Inventors: Jordi Gimenez, Barcelona (ES); Gerard Mosquera, Barcelona (ES); Joaquim Brugue, Barcelona (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 646 days.

(21) Appl. No.: 16/089,859

(22) PCT Filed: Oct. 17, 2016

(86) PCT No.: PCT/US2016/057325
§ 371 (c)(1),
(2) Date: Sep. 28, 2018

(87) PCT Pub. No.: WO2018/074991
PCT Pub. Date: Apr. 26, 2018

(65) Prior Publication Data
US 2020/0298474 A1 Sep. 24, 2020

(51) Int. Cl.
B29C 64/153 (2017.01)
B29C 64/165 (2017.01)
B29C 64/218 (2017.01)
B33Y 10/00 (2015.01)
B33Y 30/00 (2015.01)
B29C 64/214 (2017.01)
B29C 64/236 (2017.01)
B33Y 70/00 (2020.01)

(52) U.S. Cl.
CPC .......... *B29C 64/153* (2017.08); *B29C 64/165* (2017.08); *B29C 64/214* (2017.08); *B29C 64/218* (2017.08); *B29C 64/236* (2017.08); *B33Y 10/00* (2014.12); *B33Y 30/00* (2014.12); *B33Y 70/00* (2014.12)

(58) Field of Classification Search
CPC .... B29C 64/218; B29C 64/153; B29C 64/165
See application file for complete search history.

(56) References Cited

U.S. PATENT DOCUMENTS 7,384,255 B2 6/2008 Labossiere et al.
2005/0104241 A1 5/2005 Kritchman et al.
(Continued)

FOREIGN PATENT DOCUMENTS

CN 101563197 A 10/2009
CN 203470903 U 3/2014
(Continued)

Primary Examiner — Mary Lynn F Theisen
(74) Attorney, Agent, or Firm — HP Inc. Patent Development

(57) ABSTRACT

Examples of recoater carriages in an additive manufacturing system are described. In one case, a recoater carriage assembly has an elongate powder build material spreader, such as a roller, to spread powder build material in use. The recoater carriage assembly has a recoater carriage to support the spreader. The spreader is to engage and to disengage from the recoater carriage by movement of the spreader non-concentrically to a longitudinal axis of the spreader.

14 Claims, 3 Drawing Sheets

(56) References Cited

U.S. PATENT DOCUMENTS

| | | | |
|---|---|---|---|
| 2008/0150192 A1* | 6/2008 | Perret | B22F 10/20 264/308 |
| 2013/0213567 A1 | 8/2013 | Jamar et al. | |
| 2014/0263209 A1 | 9/2014 | Burris et al. | |
| 2016/0075085 A1 | 3/2016 | Sasaki | |
| 2017/0066190 A1* | 3/2017 | Klein | B29C 64/153 |
| 2017/0072643 A1* | 3/2017 | Ng | B29C 64/236 |

FOREIGN PATENT DOCUMENTS

| | | |
|---|---|---|
| CN | 204035564 U | 12/2014 |
| CN | 204844878 U | 12/2015 |
| CN | 205464327 U | 8/2016 |
| EP | 1769902 | 4/2007 |
| RU | 165868 U1 | 11/2016 |
| WO | WO-2008061727 A1 | 5/2008 |
| WO | WO-2014184117 A1 | 11/2014 |
| WO | 2016084350 A1 | 6/2016 |
| WO | 2016135974 A1 | 9/2016 |

* cited by examiner

RECOATER CARRIAGE

BACKGROUND

Additive manufacturing systems, including those commonly referred to as "3D printers" build three-dimensional (3D) objects from selective addition of build material. In an example system, build material is formed in layers in a working area. Chemical agents, referred to as "printing agents", are then selectively deposited onto each layer within the working area. In one case, the printing agents may comprise a fusing agent and a detailing agent. In this case, the fusing agent is selectively applied to a layer in areas where particles of the build material are to be fused together by subsequent application of energy, and the detailing agent is selectively applied where the fusing action is to be reduced or amplified. For example, a detailing agent may be applied to reduce fusing at an object boundary to produce a part with sharp and smooth edges. Following the application of printing agents, energy is applied to the layer. This fuses particles of build material. The process is then repeated for another layer, such that objects are built from a series of cross-sections. During a build, powder layers can be spread to provide a substantially uniformly flat build surface so that, for example, fusing agents and detailing agents can be accurately delivered.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Figure 1:
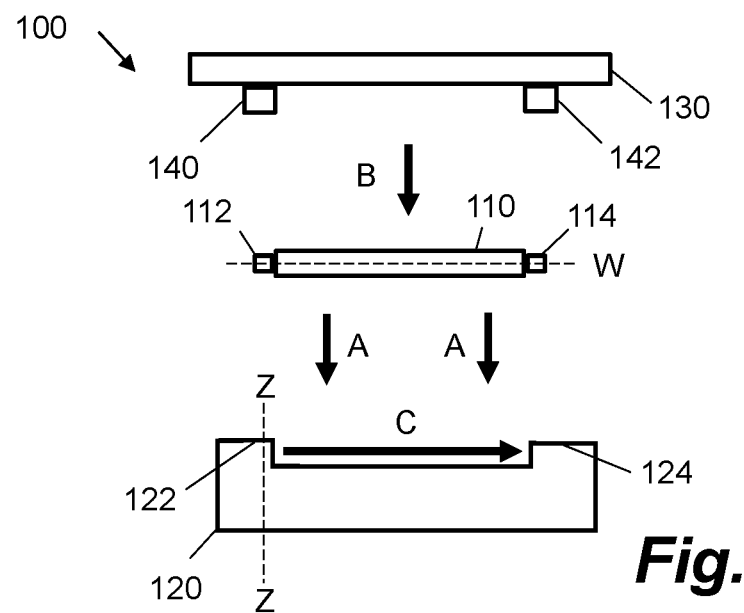
FIG. 1 is a schematic exploded diagram showing a recoater carriage assembly for use in an additive manufacturing system according to an example.

There are many build materials from which one material may be chosen for the building of a particular part. The choice of build material may be made based on the desired properties of the part. In certain additive manufacturing systems, the build material may be changed between builds accordingly. For example, in several additive manufacturing technologies, various plastic powder types can be used as the raw build material; for example thermoplastics, such as polyamide (PA) 11, PA12, and thermoplastic polyurethane (TPU), etc. A specific powder may be chosen on the basis of desired performance, or properties and features of the final built part, to better match the requirements of the user for that specific part. During a build process, the build material may be spread layer by layer over a build area. Another component of the build device may sinter or fuse regions of the build material to build 3D parts.

Various devices may be used to spread build material or build powder, for example rollers or blades, etc. The properties of the surface of the spreader may, at least in part, dictate the interaction of the spreader with the build material or build powder. Other factors to be considered in selection of a spreader for an additive build are the physical and chemical properties of the powder, which include the particle size of the powder, the particle shape of the powder, the cohesiveness of the powder, and the like. Therefore, certain spreaders may be more suitable for use with certain build powers than others. Undesirable effects that can result due to poor choice of spreader surface can include build powder becoming attached to, and rubbing against, the spreader surface. This may affect the quality of a layer of a build. Layer quality can include the uniformity of the layer and the flatness of the layer. A poor layer quality may have implications on the quality of the final built part.

In the situation when different build materials are to be used for different builds, it is desirable to have a number of different spreaders for use with the different build materials in the additive manufacturing system. Furthermore, it is desirable for the process of removing a spreader and inserting a different spreader to be simple and easy for the user to perform. Complicated spreader insertion mechanisms can lead to issues such as misalignment of a spreader. Misalignment of a spreader could impact the quality of a layer of a build. It may also lead to structural complications and mechanical stresses, which may shorten the life of elements of the additive manufacturing system itself.

Certain examples described herein help to reduce the likelihood of detrimental effects related to use of an unsuitable spreader arising during additive builds. Certain examples described herein improve the ease of engaging and disengaging a spreader with or from an additive manufacturing system. Certain examples described herein enable a user to easily remove a spreader which has become worn or damaged during a build, so that disruption to the build may be reduced. Certain examples described herein enable a user to easily remove a spreader for replacement by a different spreader prior to use of a different build material.

In certain examples described herein, a recoater carriage assembly for use in an additive manufacturing system may be used by moving a roller in a direction non-concentric to a longitudinal axis of the roller and relative to a recoater carriage to engage the roller with the carriage. In certain cases, a retainer may be moved relative to the carriage or roller, to retain the roller between the retainer and the recoater carriage. Certain cases described herein involve moving the roller in a direction orthogonal to a longitudinal axis of the roller. In certain cases, a recoater carriage assembly for use in an additive manufacturing system may be used by disengaging a first elongate recoater roller with a first surface characteristic from the recoater carriage, and engaging a second elongate recoater roller with a second surface characteristic with the recoater carriage, wherein the first surface characteristic is different from the second surface characteristic.

Certain approaches described herein provide benefits over comparative methods that allow use of a recoater carriage assembly in an additive manufacturing system by enabling the possibility of easily replacing the spreader used in a first build that used a first powder with a different spreader for use in a second build using a second powder. The first or second powder may include PA11, PA12, TPU, PA12 with glass beads, and PA12 with flame retardant. Further, certain approaches described herein enable easier use of different powders. Certain approaches described herein provide a greater uniformity of thickness of an uppermost surface of a build powder layer during an additive build, over comparative methods. Certain approaches described herein provide a more level uppermost surface of a build powder layer during an additive build, over comparative methods. Certain approaches described herein provide benefits over comparative methods by allowing a user to more rapidly remove a recoater roller to clean or replace the roller. Certain approaches described herein provide benefits over comparative methods by enabling a user to replace parts after part failure. This in turn can improve the productivity of the additive manufacturing system.

Figure 2:
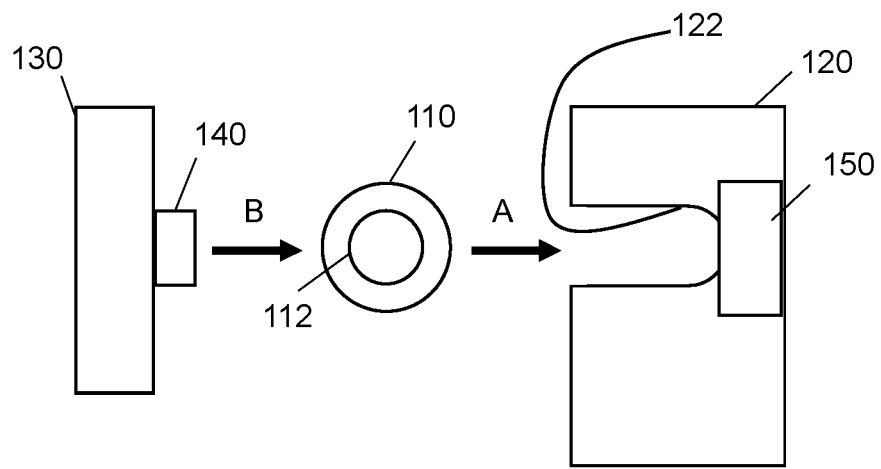
FIG. 2 is a schematic exploded diagram showing the recoater carriage assembly of FIG. 1 along the cross section Z-Z according to an example.

FIGS. 1 and 2 show exploded views of a recoater carriage assembly 100 according to an example. The recoater carriage assembly 100 is to help ensure additive build powder layers have improved surface characteristics, such as for example better level uniformity, in an additive manufacturing system during a build. The recoater carriage assembly 100 comprises an elongate powder build material spreader 110 to spread powder build material in use.

The powder build material may comprise a polymer powder. In certain specific examples, the powder build material may comprise one or more thermoplastics, such as polyamide (PA) 11, PA12, and thermoplastic polyurethane (TPU), or the like. During a build, a fusing agent may be applied to a layer of build material after the application of fusing energy to defined areas of the layer. Similarly, in certain cases, a detailing agent may be applied to areas of a layer of build material, for example to inhibit, or modify a degree of fusing. A three-dimensional object undergoing additive manufacture may thus be built layer-by-layer from a build powder. For correct application of any fusing agents and detailing agents, it is important that the build powder layer is substantially uniformly flat.

The elongate powder build material spreader 110 may spread the build powder material in use. The spreader 100 may spread the powder layer to ensure that the thickness of the layer is regular and the upper surface of the layer is flat. The spreader 110 may slide or press or roll the powder material to make the layer substantially uniformly flat and of a regular thickness. The spreader 110 may, for example, be in the form of a blade which passes across the surface of the powder layer. The spreader 110 may be, for example, a roller which rolls across the surface of the powder layer. The spreader 110 may be, for example, a presser which compresses sections of the powder layer. In an example in which the spreader 110 is a blade, the blade may pull powder across the build area from a powder well.

The recoater carriage assembly 100 comprises a recoater carriage 120 to support the spreader 110. The spreader 110 is engageable with the carriage 120. The spreader 110 is also disengageable from the carriage 120. The spreader 110 is to engage with, and to disengage from, the recoater carriage 120 by movement of the spreader non-concentrically to a longitudinal axis of the spreader 110. In this example, the engagement of the spreader 110 with the recoater carriage 120 enables the spreader 110 to move together with the recoater carriage 120 in use. In the specific example shown in FIG. 1, the spreader 110 is engaged with the carriage 120 by movement of the spreader 110 in direction A relative to the carriage 120. In a specific example, the spreader 110 is disengaged from the carriage 120 by movement of the spreader 110 relative to the carriage 120 in a direction opposite to direction A. In the specific example shown, the direction A is a direction orthogonal to the longitudinal axis W of the spreader 110. In other examples, the spreader 110 can be engaged and disengaged by movement in any other direction that is non-concentric to the longitudinal axis W of the spreader 110.

An advantage of this system is that a housing of the additive manufacturing system does not need to accommodate the movement of, for example, a retaining component in a direction concentric to the longitudinal axis W of the spreader 110, such as direction C (or a direction opposite to direction C) shown in FIG. 1. If a retaining component, housed in the carriage 120, is moved in a direction C to retain the elongate spreader 110 in the carriage 120, then the carriage 120 must have a width in direction C which is sufficient at least to accommodate the width of the spreader 110 and the retaining component end-to-end, and possibly also to accommodate the movement of the retaining component. In such a system, this requirement on carriage width increases the total size of the additive manufacturing system, but not the size of the build area. As such, this may be seen as wasted space.

In other comparative systems, to help avoid this wasted space, the spreader and carriage assembly need to be fully removed from the additive manufacturing system prior to movement of a retaining component in a direction C to retain the spreader in, or disengage the spreader from, the carriage. This arrangement clearly is not user-friendly, as the user wishes to interfere with as few components of the system as possible during engagement and disengagement of the spreader. Examples described herein provide features to help overcome these issues in such comparative systems.

In certain examples, the recoater carriage assembly 100 may comprise a retainer 130 to retain the spreader 110 in engagement with the recoater carriage 120. In the specific example shown in FIG. 1, the retainer 130 is a lid to at least partially cover the spreader 110 when the spreader 110 is engaged with the recoater carriage 120. The lid 130 is to be moved relative to the spreader 110 to retain the spreader 110 in engagement with the recoater carriage 120. In this example, the retainer 130 is moved in a direction B to retain the spreader 110 in engagement with the recoater carriage 120. In this example, direction B is parallel to direction A.

In an example, the retainer 130 comprises a resilient element 140 to bias the spreader 110 into engagement with the recoater carriage 120. In other examples, the retainer 130 may take the form of a resilient member on the carriage 120 or on the spreader 110 to bias the spreader 110 into engagement with the recoater carriage 120. The resilient element 140 may be a spring or made of rubber or other resilient material, such as neoprene or polyurethane, for example. In an example, the resilient element 140 may be positioned centrally on the retainer 130 or positioned towards one end of the retainer 130.

In certain examples, the retainer 130 may have a number of resilient elements 140, 142, which optionally may be positioned substantially evenly along one side of the retainer 130. In a specific example, the retainer 130 has two resilient elements 140, 142 positioned towards either end of the retainer 130. This arrangement provides a balance between increasing the number of resilient elements 140, 142, which would increase manufacturing costs and complexity of the system, and the stability offered to the spreader 110 when engaged with the carriage 120, which is important for correct functioning of the system.

The spreader 110 may, for example, be a roller, blade or presser and may move rotationally or laterally across the build powder layer in use to flatten the layer. The resilient elements 140, 142 are positioned to not interfere with the motion of the spreader 110 once the spreader 110 is engaged with the carriage 120. In a specific example, the spreader 110 is a roller and the roller moves across the powder layer while counter rotating. This movement and counter rotation enables the roller to move a so-called "prism of powder" across the powder layer. The "prism of powder" is a build-up of build powder that is located in front of the roller in the direction of movement of the roller across the powder layer. In this example, the resilient elements 140, 142 engage the outer surfaces of roller bearings 112, 114 that facilitate rotation of the roller relative to the carriage 120 in use. In this example, the roller bearings 112, 114 are rotatable separately to the roller. In certain examples, direct rotation of the spreader 110, rather than counter rotation, is used to move the "prism of powder".

In certain examples, the recoater carriage assembly 120 may comprise at least one recess 122. In certain examples, the carriage 120 may have more than one recess 122, 124, and each recess 122, 124 receives a portion of the spreader 110 in use. The, or each, recess 122, 124 may be comprised in a support to support the spreader 110 in use. In the example shown in FIG. 1, the carriage 120 comprises first and second recesses 122, 124. The first recess 122 is positioned towards a first end of the carriage 120, and the second recess 124 is positioned towards a second end of the carriage 120. The recesses 122, 124 shown in FIG. 1 are positioned substantially equidistantly from the longitudinal ends of the carriage 120. In this example, the first recess 122 receives a first portion 112 of the spreader 110 and the second recess 124 receives a second portion 114 of the spreader 110, in use. In certain examples, the first and second portions of the spreader 110 may be projections 112, 114 to project into the corresponding recesses 122, 124 of the carriage 120 in use. In certain examples, the spreader 110 comprises at least one projection 112, the recoater carriage 120 comprises at least one recess 122, and the at least one projection 112 of the spreader 110 projects into the at least one recess 122 of the carriage 120 when the spreader 110 is engaged with the carriage 120.

In use, the spreader 110 will contact build material, and build material may attach to the spreader 110. When a user wishes to clean or replace the spreader 110, the user is able to move the retainer 130 to permit disengagement of the spreader 100 from the carriage 120, and then disengage the spreader 110. To avoid contact with the build material, which may be attached to the spreader 110, a user can hold the projections 112, 114 of the spreader 110.

In certain examples, one or both of the projections 112, 114 of the spreader 110 may comprise a drive element, such as a first gear, and the associated recess 122, 124 of the carriage 120 may comprise a corresponding drive mechanism 150, such as a second gear, for engagement with the drive element. In the specific example shown in FIG. 2, the projection 112 of the spreader 110 engages with the drive mechanism 150 of the carriage 120 when the spreader 110 is moved to engage with the carriage 120. In certain examples, the drive element of the spreader 110 comprises a worm wheel and the drive mechanism 150 of the carriage 120 comprises a worm screw. In certain examples, the drive element of the spreader 110 and the drive mechanism 150 of the carriage 120 form a cam arrangement to enable the spreader 110 to move when the engaging projection 112 of the spreader 110 is received in the recess 122.

In the example shown in FIG. 1, the spreader 110 has two projections 112, 114; one at either end of the spreader 110. The two engaging projections 112, 114 may help align the spreader 110 within the recoater carriage assembly 100. Easy alignment of the spreader 110 helps the user to easily engage and disengage the spreader 110 from the recoater carriage 120, while not requiring overly accurate axial alignment. This helps to ensure that, during replacement or change-over of the spreader 110, the user is able to rapidly input the spreader 110 into the recesses 122, 124 to engage the spreader 110 with the recoater carriage 120.

FIG. 2 is a schematic exploded diagram showing the recoater carriage assembly of FIG. 1 along cross section Z-Z. The recess 122, in this example, is a channel or slot in the carriage 120. The spreader 110 is moved in the direction A into the channel or slot to engage with the carriage 120. In certain examples, the channel 122 has a drop at the end of the channel 122. When a user inserts the spreader 110 into the channel, the spreader 110 will drop vertically as it fully engages the carriage 120. This indicates to the user that the spreader 110 is fully in position, and helps to retain the spreader 110 positively relative to the carriage 120. The projection 112 may comprise a rotatable ball bearing or similar to help slide the roller 110 along the channel or slot 122 and into the drop. This could help prevent wear of the channel or slot 122. In cases in which the spreader 110 is a roller, the rotatable ball bearing or similar may also help reduce friction to aid rotation of the roller 110 relative to the carriage 120 in use.

In certain examples, the retainer 130 is moved in direction B shown in FIGS. 1 and 2 to retain the spreader 110 between the retainer 130 and the carriage 120. The resilient element 140 may bias the spreader 110 into engagement with the carriage 120. In an example, the retainer 130 is engaged with the recoater carriage by virtue of at least one connecting member. The connecting member may be, for example, a screw, pin, bolt, rivet, or nail etc. In a specific example, the retainer is engaged with the recoater carriage by four screws. A user can remove the retainer from the recoater carriage after unscrewing the four screws using a screw driver. This enables rapid removal of the retainer during the changing of a roller, while ensuring that the retainer is well secured to the recoater carriage in use. Certain examples described herein enable a user to replace a roller in a recoater carriage in up to three minutes.

The additive manufacturing system may have an electronic display to guide a user through the process of changing a roller for ease of use. The electronic display may confirm when the roller has been successfully engaged or disengaged. A user may wish to remove the roller to perform basic maintenance on the roller, such as to renew the roller powder walls. Renewing the powder walls may be required over the life of the 3D additive manufacturing system as the roller powder walls wear out. Such renewal may involve removing the existing wall and replacing it with another wall. By providing that the spreader is easily removable and/or insertable, a user is enabled to renew the spreader without need of a repair specialist. Certain examples herein describe methods which can be performed by a user, without specialist training in the equipment, to correct errors which may be inhibiting builds.

Figure 3:
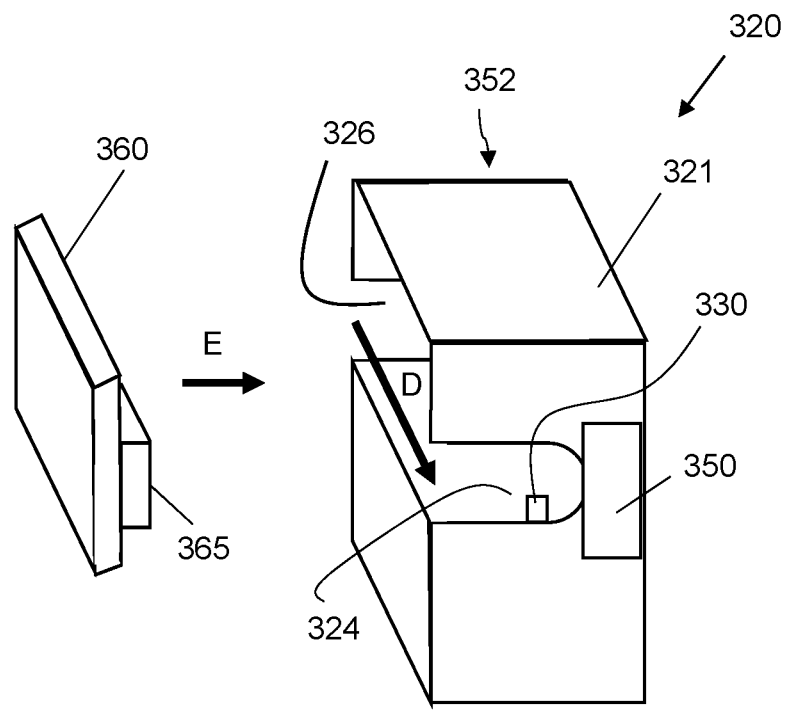
FIG. 3 is a schematic perspective view of a carriage to carry a recoater roller for use in an additive manufacturing system according to an example.

FIG. 3 is a schematic perspective view of a carriage to carry a recoater roller in an additive manufacturing system. In the specific example shown in FIG. 3, the carriage 320 comprises a frame 321 comprising a first support 324 and a second support 326. The first support 324 is spaced in a first direction D from the second support 326. The first support 324 and second support 326 are to engage a recoater roller by movement of the recoater roller in a second direction that is different from the first direction D. In certain examples, the first direction D is orthogonal to the second direction.

In certain examples, the first support 324 and the second support 326 are immovable relative to each other. A set distance between the first support 324 and second support 326 ensures that any roller with projections spaced this set distance apart are usable with the carriage 320 of FIG. 3. This allows the additive manufacturing system to accommodate many types of rollers, such as rollers with respective different surface characteristics for use in different builds.

In certain examples, at least one of the first support 324 and second support 326 comprises a channel or slot in the carriage 320, as shown in FIG. 3. The channel(s) or slot(s) may each receive a portion of the recoater roller. In certain examples, the carriage 320 comprises a resilient retainer 330 to bias the recoater roller towards the first support 324 and second support 326, when the roller is engaged with the first support 324 and the second support 326.

In certain examples, the carriage comprises a lid 360 to at least partially cover the roller when the roller is engaged with the first support 324 and the second support 326. In certain examples, the lid 360 comprises a retainer 365 to retain the recoater roller relative to at least one of the first support 324 and second support 326 when the roller is engaged with the first support 324 and the second support 326. The first support 324 and second support 326 are to engage a recoater roller by movement of the recoater roller in a second direction. The lid 360 and retainer 365 are moved in a direction E towards the supports 324, 326, to trap the roller between the retainer 365 and the frame 321 in use. In certain examples, the direction E is parallel to the second direction.

In certain examples, the carriage comprises a gear 350 to engage with a gear of the recoater roller when the recoater roller is engaged with the first support 324 and the second support 326. In an example, the gear 350, shown schematically in FIG. 3, is positioned adjacent or at the first support 324. In certain examples, the carriage comprises a first gear 350 and a second gear 352. In an example, the first gear 350 is positioned adjacent or at the first support 324 and the second gear 352 is positioned adjacent or at the second support 326. The first and second gears 350, 352 may engage respective gears of the recoater roller.

Figure 4:
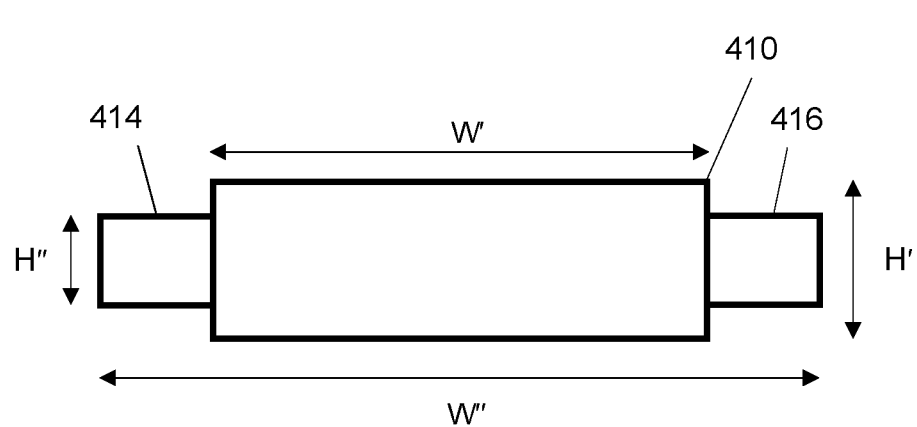
FIG. 4 is a schematic diagram showing a recoater roller for use in a recoater carriage assembly according to an example.

FIG. 4 shows an example of a spreader 400. In certain examples, the spreader 400 comprises a spreader surface 410 to contact the build material in use. In certain examples, the spreader 400 comprises end portions 414, 416 to engage with a recoater carriage. In the example shown, the dimension or height H' of the spreader surface 410 is greater than the dimension or height H" of the end portions 414, 416. In the example shown, the spreader surface 410 has a width W' and the spreader 400 has a total width W". The supports of a recoater carriage for use with the spreader 400 must be set at least the width W' of the main spreading surface 410 apart but not more than the width W" of the spreader 400 apart.

Figure 5:
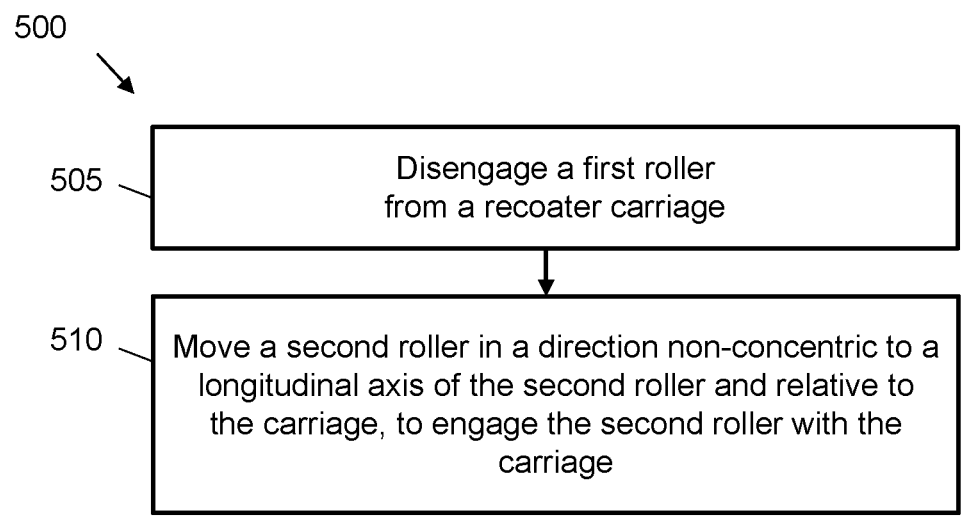
FIG. 5 is a flowchart showing a method of using a recoater carriage assembly in an additive manufacturing system according to an example.

FIG. 5 is a flowchart showing a method 500 of using a recoater carriage assembly in an additive manufacturing system according to an example. This method may be used with the recoater carriage assembly 100 of FIG. 1 or upon a different system.

At block 505, a first recoater roller is disengaged from a recoater carriage. In a specific example, the first recoater roller is an elongate recoater roller. In an example, the direction in which the first elongate recoater roller is moved to be disengaged from the recoater carriage is opposite to the direction A shown in FIG. 1. In an example, the direction in which the first elongate recoater roller is moved is a direction orthogonal to a longitudinal axis of the first elongate recoater roller.

At block 510, a second elongate recoater roller is moved in a direction non-concentric to a longitudinal axis of the second elongate recoater roller and relative to the recoater carriage, to engage the second elongate recoater roller with the recoater carriage. In this example, the engagement of the second elongate recoater roller with the recoater carriage enables the second elongate recoater roller to move together with the recoater carriage in use. In a specific example, the second elongate recoater roller is moved in the direction A shown in FIG. 1. In an example, the direction in which the second elongate recoater roller is moved is a direction orthogonal to a longitudinal axis of the second elongate recoater roller.

In an example, the first recoater roller has a surface characteristic which differs from the surface characteristic of the second recoater roller. The surface characteristic may be, for example, smoothness, texture or absorbency, or the like. The surface characteristic may be affected or determined by use of grooves on the surface of a roller used to create a rough surface. The type of grooves and dimensions of the grooves will create different types of surfaces with different characteristics. This may result in a surface that is more suited for use with one type of powder over another type of powder. The surface characteristic may be affected or determined by one or more factors including the surface material, the surface finish and the surface coating (if provided).

Build layers in additive manufacturing systems may be around 100 microns thick. The size of build powder particles may be around 50 microns. As such, it may be beneficial to ensure build powder does not attach to rollers during use. Rollers with different respective surface characteristics may interact differently with any given build powder. A first roller with a certain surface characteristic may interact with a given build powder better than another roller in which the surface characteristic differs from that of the first roller. As such, a user may wish to use a first roller with a particular surface characteristic with a first build powder, and a second roller with a second build powder, wherein the surface characteristic of the second roller differs from that of the first roller. This may help to prevent or reduce powder attaching to rollers, and may help the flattening of build layers prior to builds. Examples described herein enable a user to rapidly and easily change rollers that are held by a carriage.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A recoater carriage assembly for use in an additive manufacturing system, the recoater carriage assembly comprising:
   an elongate powder build material spreader to spread powder build material in use;
   a recoater carriage to support the spreader; and
   a lid to at least partially cover the spreader when the spreader is engaged with the recoater carriage;
   wherein the spreader is to engage with, and to disengage from, the recoater carriage by movement of the spreader non-concentrically to a longitudinal axis of the spreader;

wherein the lid is to retain the spreader relative to the recoater carriage when the spreader is engaged with the recoater carriage.

2. The recoater carriage assembly of claim 1, comprising a retainer to retain the spreader in engagement with the recoater carriage.

3. The recoater carriage assembly of claim 2, wherein the retainer comprises a resilient element to bias the spreader into engagement with the recoater carriage.

4. The recoater carriage assembly of claim 1, wherein
the spreader comprises at least one projection,
the recoater carriage comprises at least one recess, and
the at least one projection of the spreader projects into the at least one recess of the carriage when the spreader is engaged with the carriage.

5. The recoater carriage assembly of claim 1, wherein
the spreader comprises a drive element,
the carriage comprises a drive mechanism, and
the movement of the spreader is to engage the drive element of the spreader with the drive mechanism of the carriage.

6. The recoater carriage assembly of claim 1, wherein the spreader is a roller.

7. A carriage to carry a recoater roller for use in an additive manufacturing system, the carriage comprising:
a first support and a second support, wherein the first support is spaced in a first direction from the second support, and
a lid to at least partially cover a recoater roller when the recoater roller is engaged with the first support and the second support,
wherein the first support and the second support are to engage with the recoater roller by movement of the recoater roller in a second direction that is different from the first direction,
wherein the lid comprises a retainer to retain the recoater roller relative to at least one of the first support and second support when the recoater roller is engaged with the first support and the second support.

8. The carriage of claim 7, wherein the first direction is orthogonal to the second direction.

9. The carriage of claim 7, wherein the first support and the second support are immovable relative to each other.

10. The carriage of claim 7, wherein at least one of the first support and the second support comprises a channel or slot in the carriage.

11. The carriage of claim 7, wherein the retainer is resilient to bias the recoater roller towards the first support and second support when the recoater roller is engaged with the first support and the second support.

12. The carriage of claim 7, wherein the carriage comprises a gear to engage with a gear of the recoater roller when the recoater roller is engaged with the first support and the second support.

13. A method of using a recoater carriage assembly in an additive manufacturing system, the method comprising:
removing a lid that at least partially covers an elongate recoater roller and that retains the elongate recoater roller relative to a recoater carriage when the elongate recoater roller is engaged with the recoater carriage; and
moving the elongate recoater roller in a direction non-concentric to a longitudinal axis of the elongate recoater roller and relative to the recoater carriage to disengage the elongate recoater roller from the recoater carriage.

14. The method of claim 13, wherein the roller is a first roller;
wherein the method comprises, after the moving, engaging with the recoater carriage a second elongate recoater roller; and
wherein a surface characteristic of the first and second rollers differs between the first and second rollers.

* * * * *